United States Patent
Liff et al.

(10) Patent No.: US 9,377,594 B2
(45) Date of Patent: Jun. 28, 2016

(54) TWO-DIMENSIONAL, HIGH-DENSITY OPTICAL CONNECTOR

(75) Inventors: Shawna Liff, Gilbert, AZ (US); Jia-Hung Tseng, Portland, OR (US); Peter Chang, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 87 days.

(21) Appl. No.: 13/996,533

(22) PCT Filed: Dec. 29, 2011

(86) PCT No.: PCT/US2011/067940
§ 371 (c)(1),
(2), (4) Date: Jun. 20, 2013

(87) PCT Pub. No.: WO2013/101112
PCT Pub. Date: Jul. 4, 2013

(65) Prior Publication Data
US 2014/0153881 A1    Jun. 5, 2014

(51) Int. Cl.
*G02B 6/36* (2006.01)
*G02B 6/43* (2006.01)
*G02B 6/30* (2006.01)
*G02B 6/42* (2006.01)

(52) U.S. Cl.
CPC ............... *G02B 6/43* (2013.01); *G02B 6/4214* (2013.01); *G02B 6/30* (2013.01); *G02B 6/425* (2013.01); *G02B 6/4206* (2013.01); *G02B 6/4255* (2013.01); *G02B 6/4292* (2013.01)

(58) Field of Classification Search
CPC ...................................................... G02B 6/4214
See application file for complete search history.

(56) References Cited

U.S. PATENT DOCUMENTS

| 5,416,861 | A |   | 5/1995 | Koh et al. |
| 5,515,468 | A | * | 5/1996 | DeAndrea et al. ............... 385/88 |
| 5,708,743 | A | * | 1/1998 | DeAndrea et al. ............... 385/88 |
| 5,748,827 | A |   | 5/1998 | Holl et al. |
| 6,229,947 | B1 |  | 5/2001 | Vawter et al. |
| 6,364,542 | B1 |  | 4/2002 | Deane et al. |
| 6,385,374 | B2 | * | 5/2002 | Kropp ............................ 385/47 |

(Continued)

FOREIGN PATENT DOCUMENTS

| CN | 102760711 A | 10/2012 |
| JP | 05-167059   | 7/1993  |

(Continued)

OTHER PUBLICATIONS

Final Office Action for U.S. Appl. No. 13/629,355, mailed Oct. 10, 2014, 22 pages.

(Continued)

*Primary Examiner* — Rhonda Peace
(74) *Attorney, Agent, or Firm* — Blakely, Sokoloff, Taylor & Zafman LLP

(57) ABSTRACT

An optical connector includes a two-dimensional array of lenses to couple optical signals between an optical integrated circuit and an optical fiber. The optical connector has a total-internal-reflection or mirror surface that redirects light between lenses at different surfaces of the optical connector. The lens arrays collimate light directed toward the reflection surface and focuses light received from the reflection surface. The two-dimensional array and prism allows for a low-profile, high-density optical connector based on free space optical light propagation.

23 Claims, 5 Drawing Sheets

(56) References Cited

U.S. PATENT DOCUMENTS

| | | | |
|---|---|---|---|
| 6,488,417 B2* | 12/2002 | Kropp | 385/88 |
| 6,567,963 B1 | 5/2003 | Trezza | |
| 6,636,540 B2* | 10/2003 | Uebbing | 372/36 |
| 6,915,032 B1 | 7/2005 | White et al. | |
| 7,018,110 B2 | 3/2006 | Kuhara et al. | |
| 7,063,467 B2* | 6/2006 | Nagasaka et al. | 385/88 |
| 7,083,333 B2* | 8/2006 | Hodgson | G02B 6/4292 385/53 |
| 7,118,293 B2* | 10/2006 | Nagasaka et al. | 385/89 |
| 7,316,512 B2 | 1/2008 | Shih et al. | |
| 7,343,058 B2 | 3/2008 | Block et al. | |
| 7,369,328 B2* | 5/2008 | Yamamoto et al. | 359/726 |
| 7,539,366 B1 | 5/2009 | Baks et al. | |
| 7,556,440 B2* | 7/2009 | Birincioglu et al. | 385/93 |
| 8,238,699 B2 | 8/2012 | Allouche | |
| 8,315,492 B2* | 11/2012 | Chen et al. | 385/33 |
| 8,335,411 B2* | 12/2012 | Kuznia et al. | 385/33 |
| 8,554,030 B2* | 10/2013 | Noguchi | 385/33 |
| 8,641,296 B2* | 2/2014 | Nishimura | 385/92 |
| 8,666,204 B2 | 3/2014 | Wu et al. | |
| 8,676,006 B2* | 3/2014 | Morioka | 385/33 |
| 8,724,944 B2* | 5/2014 | Kuznia et al. | 385/33 |
| 8,787,714 B2* | 7/2014 | Morioka | G02B 6/4214 385/15 |
| 8,939,657 B2* | 1/2015 | Hung | G02B 6/42 385/89 |
| 9,035,234 B2* | 5/2015 | Wu | H01L 31/12 250/239 |
| 9,046,665 B2* | 6/2015 | Hung | G02B 6/4214 |
| 9,063,281 B2* | 6/2015 | Lin | |
| 9,086,552 B2* | 7/2015 | Huang | G02B 6/423 |
| 9,134,487 B2* | 9/2015 | Chang | G02B 6/4204 |
| 9,235,012 B1* | 1/2016 | Hung | G02B 6/4214 |
| 2002/0071639 A1* | 6/2002 | Kropp | 385/88 |
| 2004/0202477 A1* | 10/2004 | Nagasaka | G02B 6/4292 398/138 |
| 2004/0234210 A1* | 11/2004 | Nagasaka | G02B 6/4214 385/88 |
| 2005/0054199 A1 | 3/2005 | Block et al. | |
| 2005/0128471 A1 | 6/2005 | Wilsher et al. | |
| 2006/0126987 A1 | 6/2006 | Kang et al. | |
| 2006/0164738 A1 | 7/2006 | Yamamoto et al. | |
| 2006/0210213 A1 | 9/2006 | Huang et al. | |
| 2007/0077008 A1 | 4/2007 | Jeon et al. | |
| 2008/0226228 A1* | 9/2008 | Tamura et al. | 385/33 |
| 2009/0269704 A1 | 10/2009 | Hodono | |
| 2010/0215313 A1* | 8/2010 | Matsuoka et al. | 385/14 |
| 2010/0220957 A1 | 9/2010 | Asahi et al. | |
| 2011/0064358 A1* | 3/2011 | Nishimura | 385/33 |
| 2012/0057822 A1 | 3/2012 | Wu et al. | |

FOREIGN PATENT DOCUMENTS

| | | |
|---|---|---|
| JP | 2000-227529 | 8/2000 |
| JP | 2010-122312 | 6/2010 |
| JP | 2010122312 | 6/2010 |
| TW | I278673 B | 4/2007 |
| TW | 200942887 A | 10/2009 |
| TW | 201144883 A | 12/2011 |
| TW | 201211606 A | 3/2012 |

OTHER PUBLICATIONS

Office Action and Taiwan Search Report from foreign counterpart Taiwan Patent Application No. 101147181 mailed Aug. 11, 2014, 10 pages.

International Preliminary Report on Patentability for International Application No. PCT/US2011/067940, mailed Jul. 10, 2014, 8 pages.

International Preliminary Report on Patentability for International Application No. PCT/US2011/068105, mailed Jul. 10, 2014, 7 pages.

Office Action for U.S. Appl. No. 13/629,355, mailed Mar. 25, 2014, 12 pages.

International Search Report and Written Opinion, Application No. PCT/US2011/066445, Dated Jun. 2, 2012, 6 Pages.

International Search Report and Written Opinion from PCT/US2011/067940 mailed Jul. 31, 2012, 10 pages.

Notice of Allowance from foreign counterpart Taiwan Patent Application No. 101147181, mailed May 14, 2015 and the allowed claims, total 8 pages.

* cited by examiner

TWO-DIMENSIONAL, HIGH-DENSITY OPTICAL CONNECTOR

This application is a U.S. National Phase application under 35 U.S.C. §371 of International Application No. PCT/US11/67940 filed Dec. 29, 2011, and claims the benefit of priority to that International Application.

FIELD

Embodiments of the invention are generally related to optical interconnections, and more particularly to an optical connector with a two-dimensional array of lenses.

COPYRIGHT NOTICE/PERMISSION

Portions of the disclosure of this patent document may contain material that is subject to copyright protection. The copyright owner has no objection to the reproduction by anyone of the patent document or the patent disclosure as it appears in the Patent and Trademark Office patent file or records, but otherwise reserves all copyright rights whatsoever. The copyright notice applies to all data as described below, and in the accompanying drawings hereto, as well as to any software described below: Copyright© 2011, Intel Corporation, All Rights Reserved.

BACKGROUND

The demand for computing devices continues to rise, even as the demand for computing devices to achieve higher performance also rises. However, conventional electrical I/O (input/output) signaling is not expected to keep pace with the demand for performance increases, especially for future high performance computing expectations. Currently, I/O signals are sent electrically from the processor (e.g., CPU—central processing unit) through the processor package (or just package), socket (which is sometimes not present), and board to electrical cables and/or backplanes. Electrical signals must pass through one or more levels of solder joints, traces, cables, and other electrical conductors. Electrical I/O signal rates are limited by the electrical characteristics of the electrical connectors, package, and board traces. In addition, the need for equalization and the high losses of package and board traces and connectors result in poor scaling of energy per bit.

While the use of photonic components finds increasing use in computing devices, current optical signaling solutions are not scalable to the level needed to access the potential advantages of optical communication. The use of optical signals in device communication has significant potential advantages over electrical communication, namely in terms of power and theoretical bandwidth at distances greater than 1 m. However, the inability to scale the solutions prevents current optical interconnect systems from meeting the requirements of many high performance computing applications.

An alternative to electrical signaling in use today is based on optical cables that receive an electrical signal and convert it to optical. Such cables transfer optical signaling that terminates far from the processor, which requires electrical-optical conversion and electrical transfer that creates a bottleneck to the processor. Serial connections to the processor are too slow to take advantage of the optical signaling throughput capabilities, and parallel connections to the processor require a significant amount of board real estate and pins to the processor package. In addition, the current components used in the optical signaling and electrical-optical coupling do not scale in a way that is usable with high-volume manufacturing. Currently, there are no optical connectors that can provide the form factor needed or the two-dimensional scalability and manufacturability needed with sufficiently low optical loss to enable closer optical termination.

BRIEF DESCRIPTION OF THE DRAWINGS

The following description includes discussion of figures having illustrations given by way of example of implementations of embodiments of the invention. The drawings should be understood by way of example, and not by way of limitation. As used herein, references to one or more "embodiments" are to be understood as describing a particular feature, structure, or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive.

Figure 1:
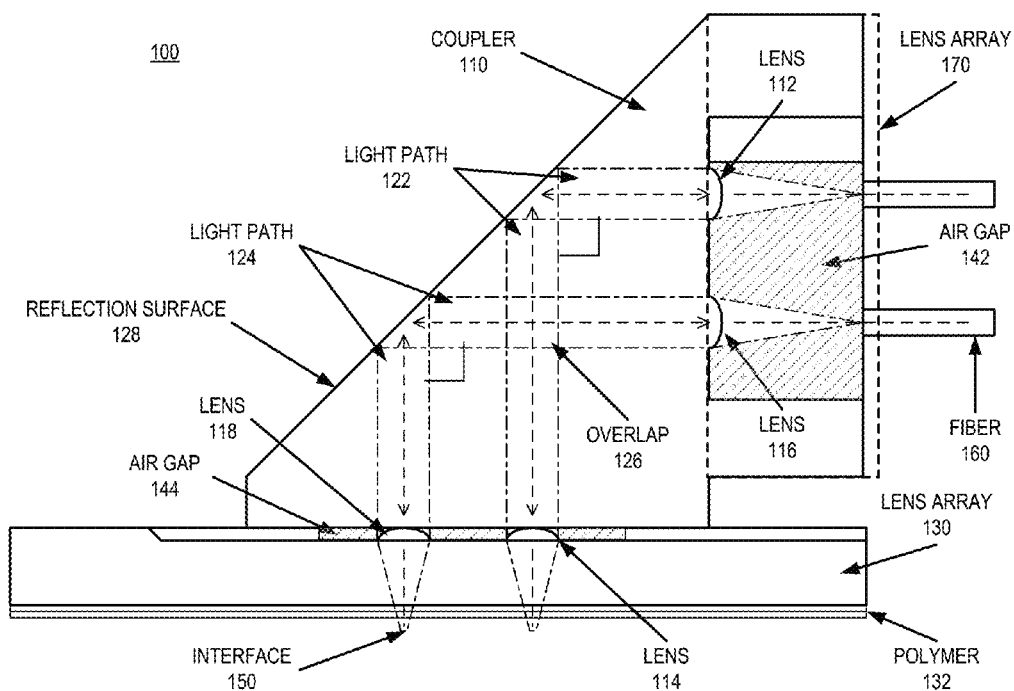
FIG. 1 is a block diagram of an embodiment of a two-dimensional optical connector.

Descriptions of certain details and implementations follow, including a description of the figures, which may depict some or all of the embodiments described below, as well as discussing other potential embodiments or implementations of the inventive concepts presented herein. An overview of embodiments of the invention is provided below, followed by a more detailed description with reference to the drawings.

DETAILED DESCRIPTION

As described herein, an optical connector includes a two-dimensional array of lenses to couple optical signals between an integrated circuit and an optical fiber. The optical connector has a reflection surface that redirects light at approximately a right angle between lenses at different surfaces of the optical connector. The lens arrays collimate light directed toward the reflection surface and focus light received from the reflection surface. The reflection surface can be a total internal reflection (TIR) surface or a mirror. The two-dimensional array allows for a low-profile, high-density optical connector.

In one embodiment, the right-angle redirection is a 90 degree redirection from vertical to horizontal. The redirection occurs in free space within the connector, and does not require a specific waveguide in the connector, as opposed to many other connectors. The redirection through free space can occur when the connector is made from a linear electromagnetic material that allows light to propagate through it with minimal optical loss at the wavelength(s) of interest. Such materials include glass or other appropriate crystalline inorganic materials and/or amorphous plastic structures having sufficient optical clarity at the wavelengths of interest. It will be understood that amorphous materials can be molded, whereas crystalline materials would need to be manufactured using other techniques.

The use of glass or other inorganics can provide a connector with a low CTE (coefficient of thermal expansion) and high softening temperatures, maximizing dimensional stability, that will allow the connector to survive standard solder reflow assembly processes. The low CTE minimizes the mismatch between the connector and device. Thus, the connector can be mounted on a substrate that will pass through a reflow solder process with minimal dimensional deformation or thermal-elastic stress. The similar CTE between the connector and device enables the use of standard high-precision assembly equipment to place and mount components passively, avoiding special assembly processes, e.g., active alignment, when using the connector.

With a connector that turns light 90 degrees in free space, it is possible to have a two-dimensional (2D) array of lenses at different facets or surfaces of the connector or mating components. Thus, optical lenses can be placed to allow the exchange of optical signals in a form factor of less than 2.6 mm, which is a size sufficient to fit between a top of a substrate and bottom of a heatsink in one embodiment of a processor package. Additionally, the precision of the connector and the ability to use mass assembly techniques to set the connector in a system allows it to be used with either single-mode or multimode fiber.

FIG. 1 is a block diagram of an embodiment of a two-dimensional optical connector. Assembly 100 represents an optical connector or optical coupler. While the assembly can be described as either a connector or a coupler, for simplicity in description reference is made to a coupler in reference to the figures below. While certain details of assembly 100 are intended to show relative placement and size, the features of assembly 100 are not necessarily intended to be understood as drawn to scale. Various modifications could be made to size and placement of features of assembly while still showing the features of the lens array, the right-angle redirection, and the reflection surface (e.g., TIR or mirror).

Assembly 100 illustrates one possible embodiment where coupler 110 includes lenses 112 and 116 disposed on a surface of the coupler, while lenses 114 and 118 are disposed in lens array 130, which is separate from the coupler body. Light path 122 is formed between lens 112 and lens 114, while light path 124 links lenses 116 and 118. It is understood that light paths 122 and 124 include an approximately 90 degree redirection. While other angles of redirection could be used, one advantage to a 90 degree redirection is that the height of coupler 110 can be lower than for other angles of reflection.

Light paths 122 and 124 are light propagation in free space inside coupler 110. The light does not need a specific waveguide because of the collimation and focusing of light provided by the lenses at either end of the light paths. Light paths 122 and 124 propagate collimated (photons generally all have the same direction of propagation) light signals. Lenses 112, 114, 116, and 118 modify incoming and outgoing beams of light to enable the propagation through coupler 110. The modification enables the lens design to be applicable to both single-mode and multimode optical connections.

In one embodiment, lenses 112 and 116 are disposed on an inset surface of coupler 110, which includes air gap 142. The light propagated from lens 116 to fiber 160 will be focused to enter into fiber 160. Light propagated from fiber 160 will expand as it exits the fiber, until it enters lens 116. The distance of the inset can be modified, and the size and shape of the lenses can be modified to match the focal point of the lens on to the end of the fiber, and match the spreading of light from the fiber to be encompassed and collimated by the lens. In one embodiment, lenses 114 and 118 are disposed in an inset of lens array 130, which includes air gap 144 between the lens array and the bottom of coupler 110.

Similar to lens 116 interfacing with fiber 160, lens 118 interfaces with interface 150, which is a light source or a light target on a component on which assembly 100 is disposed. Polymer 132 can interface lens array 130 with the component. In one embodiment, the component is an integrated optical circuit. The interface can be a grating emitting light toward lens 118 from interface 150, or a photodetector to which lens 118 focuses light. In one embodiment, interface 150 is a mirror that redirects light into and out of a waveguide on an optical integrated circuit. In another embodiment, interface 150 is a VCSEL (vertical cavity surface emitting laser) emitting light toward lens 118.

In one embodiment, light path 122 crosses over (through) light path 124, as represented by overlap 126. If the lenses are offset, overlap 126 can be avoided. However, overlap 126 is expected to not affect the optical signaling through coupler 110 if the coupler is composed of linear electro-magnetic material. The signals are collimated within their respective light paths, and are thus orthogonal to each other. Simulation and observation of systems based on the design of assembly 100 suggest that optical interference is minimal when light path 122 crosses through light path 124. Additionally, it will be understood that even in an always-on light signaling scenario (where signaling is accomplished by modulating the laser), there may not be constant overlap of signals even if the light paths overlap.

It will be understood that orientation is generally arbitrary. The light bending or redirection of the optical signal can occur between any two points oriented in any way through assembly 100. In one embodiment, the orientation of assembly 100 is as depicted in the drawing, where vertical light is light that is propagated through lens 118, and horizontal light is light that is propagated through lens 116. It will also be understood that vertical light can be produced by an edge-emitting laser device.

Regardless of orientation, the following convention can be used to refer to the different surfaces or facets of the disclosed connector. An outward-facing surface is the surface of the assembly that mates with an optical fiber array (e.g., to an MT ferrule). A circuit-facing surface is the surface of the assembly that mates with an integrated optical circuit. Reflection surface 128 is angled with respect to the outward-facing and circuit-facing surfaces, and redirects light signals at approximately 90 degrees. It will be understood that reflection surface 128 redirects collimated light without affecting the optical signal. In one embodiment, reflection surface 128 is a TIR surface that reflects light based on the difference in refractive index between the material of coupler 110 and the substance outside the coupler (e.g., air). In one embodiment, reflection surface 128 is a mirror, i.e., a surface covered by a layer of reflective metal.

In one embodiment, coupler 110 is a molded prism, and lenses 112 and 116 are part of a 2D lens array molded onto the outward-facing surface of coupler 110. In one embodiment, as depicted below in FIG. 2, lenses 114 and 118 are molded onto the circuit-facing surface of coupler 110. In another embodiment, lenses 114 and 118 are molded onto a separate lens array 130, which is then attached to coupler 110 to form assembly 100. In another embodiment, lenses 112 and 116 are part of a discrete lens array 170 (the dashed line box) that can be attached to the coupler body similarly to lens array 130. In such an embodiment, there can be an air gap between lens array 170 and coupler 110, similar to air gap 144. In another embodiment, lenses 112 and 116 are part of lens array 170 that is fabricated as a separate lens that mates to the fiber connector or is mounted atop or molded within the fiber connector (e.g., MT ferrule) and plugs into coupler 110. If mounted with the fiber connector, lens array 170 can be mated with coupler 110 via guide pins and alignment holes. In one embodiment, lens array 170 is inset into the fiber connector.

In one embodiment, fiber 160 is a multimode fiber (MMF). Typically, commercial couplers use MM fiber connections. In one embodiment, fiber 160 is a single-mode fiber (SMF). Single mode alignment requires a tighter alignment. There is roughly a 50 µm core for MMF, with an alignment tolerance of approximately 15 µm pending the optical design. The core size for SMF is 8 µm with an alignment tolerance of approximately 1 µm. The tighter tolerances are achievable with the design disclosed herein.

Figure 2:
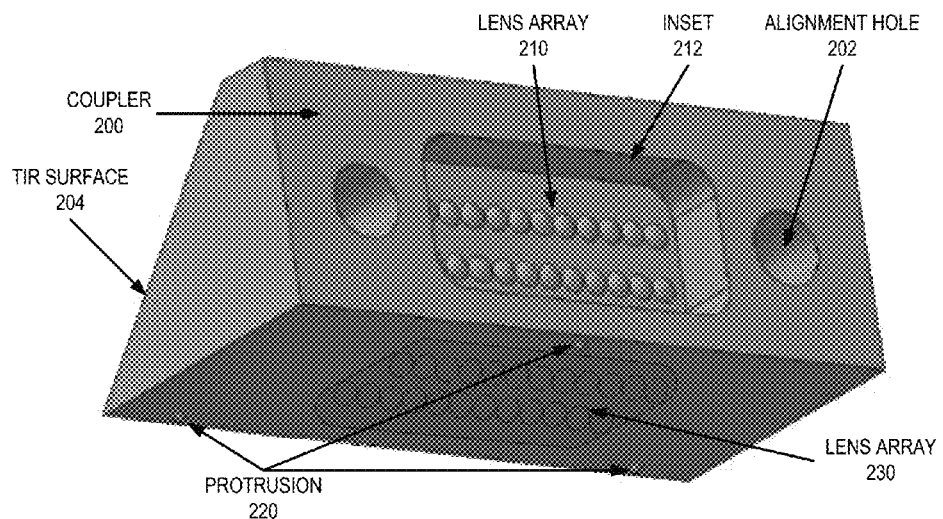
FIG. 2 is a block diagram of an embodiment of a perspective view of a lens array of an optical connector.

FIG. 2 is a block diagram of an embodiment of a perspective view of a lens array of an optical connector. Coupler 200 illustrates an optical connector that has a molded lens array (MLA) on an outward-facing surface and another MLA on a circuit-facing surface of the coupler. One advantage of having all lenses molded into the same coupler body is that assembly is simpler due to the fewer number of components. On the other hand, having all lenses molded into the same coupler body can only succeed when the manufacturing process that makes the lenses has sufficiently small margin of error.

In one embodiment, coupler 200 is a right triangle prism. Lens array 210 is an MLA disposed on the outward-facing surface of coupler 200. Lens array 230 is an MLA disposed on the circuit-facing surface of coupler 200. Each lens array is shown as a 2D array, with two rows and 12 elements in each row. While shown as 2×12, the lens array could be a 1×12, 4×12, 2×6, 2×8, or other configuration. The form factor (x, y, and z dimensions of the coupler) can remain the same for any of the different lens array configurations. While it is easy to understand spacing the lenses farther apart, the rows of lenses could also be spaced vertically closer together to fit the 4×N configurations.

The optical paths between lenses, and the redirection off of reflection surface 204 can be understood to be the same as the discussion above with respect to similar features of assembly 100. Briefly, optical signals will be exchanged between one or more lenses of lens array 210 to corresponding lenses of lens array 230. A corresponding lens refers to a lens that is positioned along an optical path from a lens of one array, and off reflection surface 204.

In one embodiment, lens array 210 is disposed on coupler 200 in inset 212. Inset 212 can be designed to provide a desired spacing between the lenses and fibers of a connector that interfaces with coupler 200. In one embodiment, coupler 200 includes one or more protrusions 220 for purposes of alignment of coupler 200. The protrusions may not be necessary when lens array 230 is disposed on coupler 200.

In one embodiment, coupler 200 includes alignment hole 202, which allows for proper alignment of the lenses of lens array 210 with a mating connector. In one embodiment, alignment hole 202 fits a standard guide pin used in optical assembly, which has a 0.6895±0.0005 mm diameter. The standard guide pins are typically made of stainless steel. Alignment hole 202 is a precision hole, designed to fit snugly with an alignment pin. For example, alignment hole 202 can measure 0.699-0.700 mm in diameter enabling a snug fit. It may be necessary to temporarily chill the guide pins prior to mating the connector to ensure easy assembly.

Figure 3:
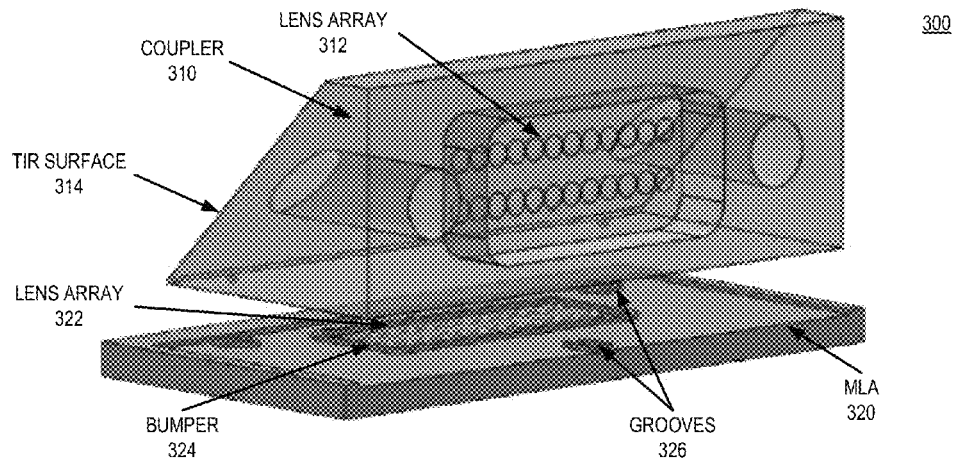
FIG. 3 is a block diagram of an embodiment of a perspective view of an optical connector having an integrated lens array and an attachable lens array.

FIG. 3 is a block diagram of an embodiment of a perspective view of an optical connector having an integrated lens array and an attachable lens array. Assembly 300 includes a two-piece optical connector system. Assembly 300 includes coupler 310 and discrete micro lens array (MLA) 320. MLA 320 can be molded or processed on at a wafer scale. Lens array 312 is molded on the face of coupler 310. Lens array 322, which includes lenses corresponding to the lenses of lens array 312, is processed using grayscale lithography and selective etching into MLA 320. TIR surface 314 on coupler 310 provides redirection of optical signals between corresponding lenses of the lens array, forming the optical paths in the free space of coupler 310.

For either coupler 200 of FIG. 2 with lenses molded on two different surfaces of the coupler body, or assembly 300 with one lens array molded on one surface of the coupler body and another lens array on a separate discrete component, or two discrete lens arrays (one on the integrated optical circuit side and the other on the fiber side), the coupler includes various features. First, the coupler includes a circuit-facing lens array (lens arrays 230, 322) that collimates light emitted (Tx) from a device (e.g., laser, VCSEL (vertical cavity surface-emitting laser), or waveguide) and focuses collimated light (Rx) into a device (e.g., detector or waveguide). The lenses within the arrays can be identical to each other, or different pending design needs, complexity, and cost.

Next, the coupler includes an angled face for redirection (reflection surfaces 204, 314) of the optical signal via index contrast between the component material and the surrounding material (e.g., glass to air) or reflection off a metalized mirror surface. Additionally, the coupler includes a second lens array (lens arrays 210, 312) that focuses light into fibers embedded in a fiber ferrule or collimates the light emitted from fibers into the coupler component.

In one embodiment, the coupler body includes an inset (inset 212) from the surface that interfaces with the fiber ferrule. The inset can ensure the distance between the outward facing lens array and the fibers matches the focal length specified by the optical design. In one embodiment, the coupler body also includes precision alignment holes for guide pins (e.g., to mate with standard with MT ferrules).

The alignment tolerance of the discrete lens array to the circuit side is ~1 µm when a multi-piece assembly, e.g., the two-piece assembly 300, is employed. While the protrusions are optional on coupler 200, there needs to be protrusions or a comparable mechanism on coupler body 310 (not specifically shown). The protrusions on coupler body 310 mate with grooves 326 of MLA 320 to align the two pieces. In one embodiment, coupler 310 is attached to MLA 320 by epoxy or another adhesive material. Thus, in one embodiment, MLA 320 includes bumper 324 that surrounds lens array 322, to prevent adhesive from entering the area of the lenses.

Optical simulation predicts that insertion loss of assembly 300 is approximately 2 dB when there is no misalignment between lenses (e.g., between lenses of lens array 312 and lens array 322) and 3 dB when the lenses are misaligned±3 µm. By splitting the 2D array for bending light 90 degrees into two separable lens pieces (coupler 310 and MLA 320), larger misalignment between lens array 312 and the device is tolerable, assuming lens array 322 is perfectly aligned to the device to which it attaches, which can be achieved by fabricating it directly on the device. In one embodiment, assembly 300 can accommodate 5 times larger misalignment between lens array 312 and the device than between coupler 200 (i.e., a single component design) and the device. The additional tolerance is derived from mating to collimated light from the device enabling a larger window for misalignment than is available when mating to a diverging light source.

Figure 4:
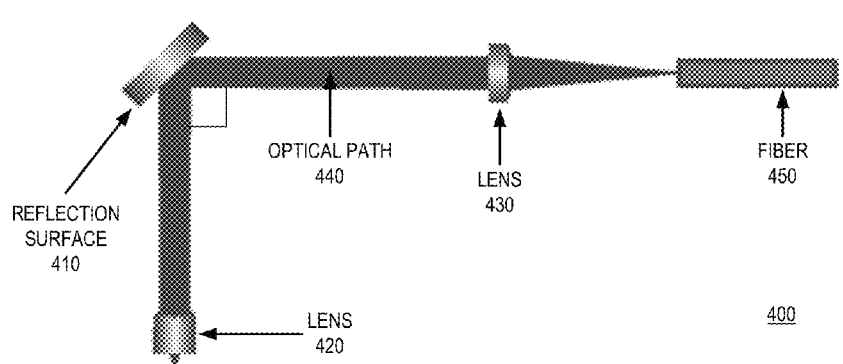
FIG. 4 is a block diagram of an embodiment of an optical pathway.

FIG. 4 is a block diagram of an embodiment of an optical pathway. System 400 shows optical path 440 between lens 430 and lens 420, via reflection surface 410. Similar to what is described above, reflection surface 410 can be a TIR feature or a mirror. In one embodiment, reflection surface 410 is an angled surface that relies on differences of refractive index to reflect the light of optical path 440. In one embodiment, reflection surface 410 includes metal on the outer angled surface of a prism coupler body (i.e., a mirror) that reflects the light of optical path 440. Fiber 450 is the source of an optical signal for receive, and the target of an optical signal for transmit.

In one embodiment, as depicted, lenses 420 and 430 are not necessarily of the same shape or same size. For example, lens 420 can be shaped to have a shorter focal length than the focal length of lens 430 or vice versa.

Figure 5:
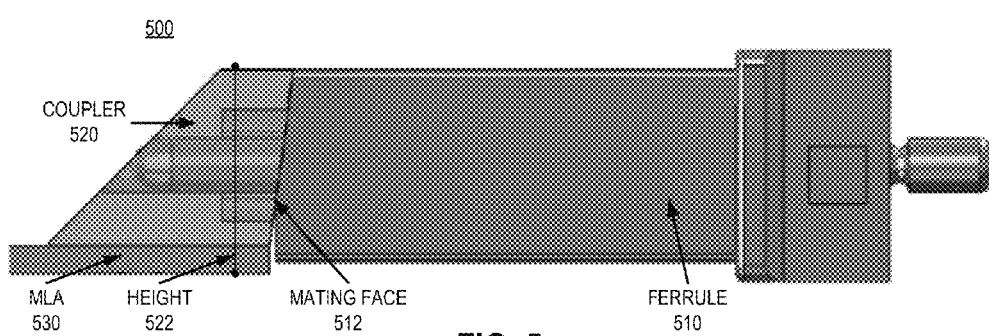
FIG. 5 is a block diagram of an embodiment of an optical connector interfaced with an optical ferrule.

FIG. 5 is a block diagram of an embodiment of an optical connector interfaced with an optical ferrule. System 500 illustrates the interfacing of a two-piece coupler with a standard ferrule. In one embodiment, ferrule 510 is a standard MT (multi-terminal) ferrule. Ferrule 510 can be manufactured with an angled mating face 512 to reduce back reflection of the optical signal. In one embodiment, ferrule 510 is manufactured with an 8 degree mating face, as is standard in the industry. Coupler body 520 is attached to MLA 530 (which could be replaced with a single-piece connector or two discrete lens arrays and a coupler prism), and the coupler assembly mates with ferrule 510 (or a lensed MT ferrule). The outward-facing surface of coupler 520 is its mating face, and can have an angled design corresponding to the angle of mating face 512. Alternatively, coupler can have a flat-face, and mating face 512 can also be flat (instead of angled as shown).

The component design—the position of the lenses, shape of the lenses, design of the face, should be made to accommodate the optical impact of the connector to which it will interface (e.g., ferrule 510). Ferrule 510 includes an array of optical fibers to interface with the lens array configuration of coupler 520. Existing connectors that turn light 90 degrees typically only accommodate multimode light, and are too large to fit within a CPU package. System 500, in contrast, uses 2D lens arrays, and can be made to fit within the space available in a CPU package. Height 522 can be 2.6 mm or less, which can enable taking the optical connection onto the CPU package, as shown in one embodiment of FIG. 7 below.

In one embodiment, MLA 530 is built directly on a device or planar light circuit or assembled on top of it. Coupler 520 can be positioned using standard pick and place equipment. In one embodiment, coupler 520 is attached to MLA 530 using kinematic coupling with die attach film or CUF (capillary underfill) or other bonding techniques. In an embodiment where coupler 520 is composed of glass or other inorganic material or high thermal stability polymer, the component can survive BGA (ball grid array) reflow without deforming.

In one embodiment, height 522 is approximately 2.625 mm, with 0.325 mm for MLA 530, 2.35 mm for coupler body 520, and 0.05 mm of feature overlap. There is no fundamental reason why height 522 could not be made smaller. It will be understood that even a four-row lens array could be disposed in the device as shown with a height of 2.6 mm or less. For example, two rows of lenses could be disposed on coupler 520 with a pitch of 250 μm, and reduced to a pitch of 125 μm to include four rows without increasing the form factor of the components.

Figure 6A:
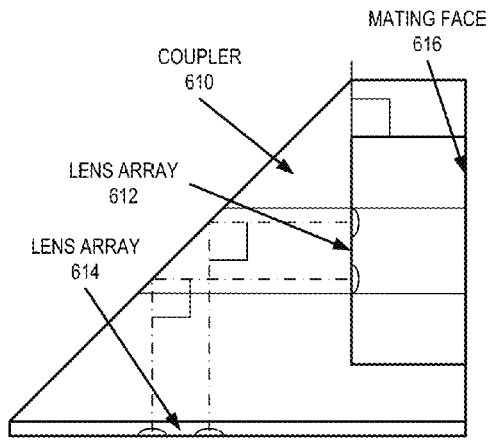
FIGS. 6A-6C illustrate block diagrams of embodiments of an optical connector with a straight mating face, angled mating face, and hybrid mating face, respectively.
Figure 6B:
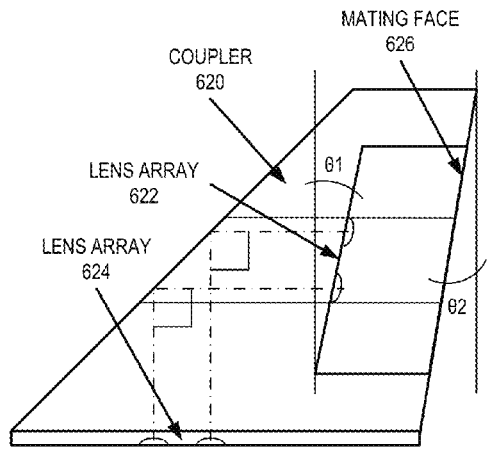
Figure 6C:
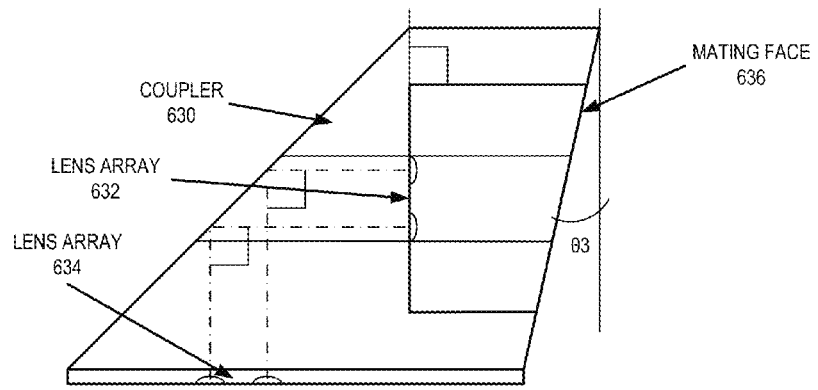

FIGS. 6A-6C illustrate block diagrams of embodiments of an optical connector with a straight mating face, angled mating face, and hybrid mating face, respectively. It will be understood that there is a distinction between the angle of the mating face and the angle of redirection of the optical paths. For purposes of reference, optical paths are shown in each of couplers 610, 620, and 630. The optical paths within the coupler are redirected at approximately a right angle, regardless of the configuration of the mating face (angled or flat). Note that the position of the fibers or lenses, or shape of the lenses may need to be shifted/altered to accommodate the influence of the angled facet(s).

Referring to FIG. 6A, coupler 610 includes lens array 612 and lens array 614. Mating face 616 is flat, as is the surface on which lens array 612 is disposed. In one embodiment, mating face 616 is also vertical. The most efficient interface to mating face 616 is a flat (i.e., not angled) surface of a mating connector (e.g., an MT ferrule).

Referring to FIG. 6B, coupler 620 includes lens array 622 and lens array 624. Lens array 622 is disposed on an angled inset surface of mating face 626. Mating face 626 is angled with an angle of degree θ2. The angle of the surface on which lens array 622 is disposed is θ1. In one embodiment, θ1 is not the same as θ2. The interface is more efficient when θ1 is the same as θ2. Additionally, the most efficient interface to mating face 626 is an angled surface of equal and opposite angle.

Referring to FIG. 6C, coupler 630 includes lens array 632 disposed on a flat surface, and lens array 634. Mating face 636 is angled with an angle of degree θ3. Coupler 630 can be referred to as a hybrid design with the angled mating face and flat surface of the lens array. The hybrid design as shown will interface with an angled connector having a face of equal and opposite angle. An alternative hybrid design could include an angled surface on which lens array 632 is disposed, and a flat mating face 636. The hybrid design is not as efficient an interface as either flat-to-flat or angled-to-angled as shown above.

Figure 7:
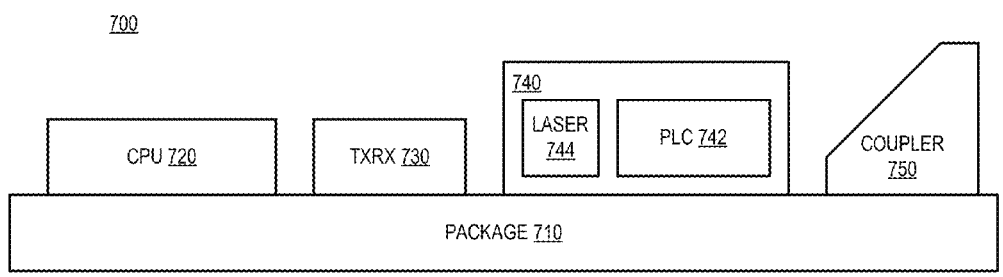
FIG. 7 is a block diagram of an embodiment of a system with photonic components disposed on processor packaging in which an optical connector can be used.

FIG. 7 is a block diagram of an embodiment of a system with photonic components disposed on processor packaging. System 700 is a processor. It will be understood that the elements shown are representative only of what can be included, and are not intended to be to scale. In a practical system, the processor is typically much larger than the other components. System 700 includes CPU 720. CPU 720 is intended to show any type of processor die, and is not limited to any particular processor type. Thus, use of "CPU" is to be understood broadly to include a processor die included in a package.

CPU 720 is directly coupled to package 710, which represents a package substrate. While not shown, package 710 includes mechanisms (e.g., pins or connection balls) to interface system 700 to an external device, such as a printed circuit board (PCB). Package 710 can also be represented as "PKG". Package 710 includes transmit/receive (Tx/Rx—or simply "transceiver") chip 730, which could alternatively be included on CPU 720. Transceiver 730 includes transmit and receive circuits that transfer electrical signals, and more specifically handle the timing or other protocol aspects of electrical signals corresponding to an optical signal. Transceiver 730 connects to CPU 720 over package 710, such as through traces processed into package 710. In one embodiment, CPU 720 and transceiver 730 are flip-chip bonded to package 710.

System 700 includes electrical-optical components 740, which can include lasers (such as laser 744), photodetectors, and modulators. System 700 generically illustrates the components, and does not specifically illustrate the photodetectors or modulators. It will be understood that photodetectors and modulators will be positioned on the same substrate as coupler 750 to enable the transfer of light between the coupler and the electrical-optical circuits. The electrical-optical components provide conversion from an electrical-to-optical signal or from an optical-to-electrical signal.

PLC 742 refers generally to any substrate for electrical-optical circuits. PLC can specifically mean "planar lightwave chip" or "planar light-wave circuit", and refers to integrated components that provide a plane for the transfer of light and its conversion to electrical signals, and vice versa. Laser 744 can be any type of laser chip suitable for producing optical signals, such as an edge-emitting device or a VCSEL. In one embodiment, PLC 742 is an inorganic PLC, which has a lower CTE (coefficient of thermal expansion) than organic materials, which allows for dimensional stability and CTE matching during reflow processing.

Coupler 750 provides a redirection mechanism to exchange light between system 700 and something external to system 700 (e.g., another device) over optical fibers (not shown). Coupler 750 can be a coupler in accordance with any embodiment described herein. Coupler 750 provides a redirection of optical signals via a reflection surface. The angle and general dimensions and shape of coupler 750 are dependent on the wavelength of optical light, as well as the material used to make the coupler and the overall system requirements. In one embodiment, coupler 750 is designed to provide redirection of vertical light from substrate 710 and of horizontal light to substrate 710.

In system 700, the transceiver circuits (transceiver 730) are brought physically close to the electrical-optical conversion (by components 740), which increases the efficiency of the system. Additionally, the transceiver circuits are physically close to the processor die (CPU 720), being inside the processor package.

Figure 8:
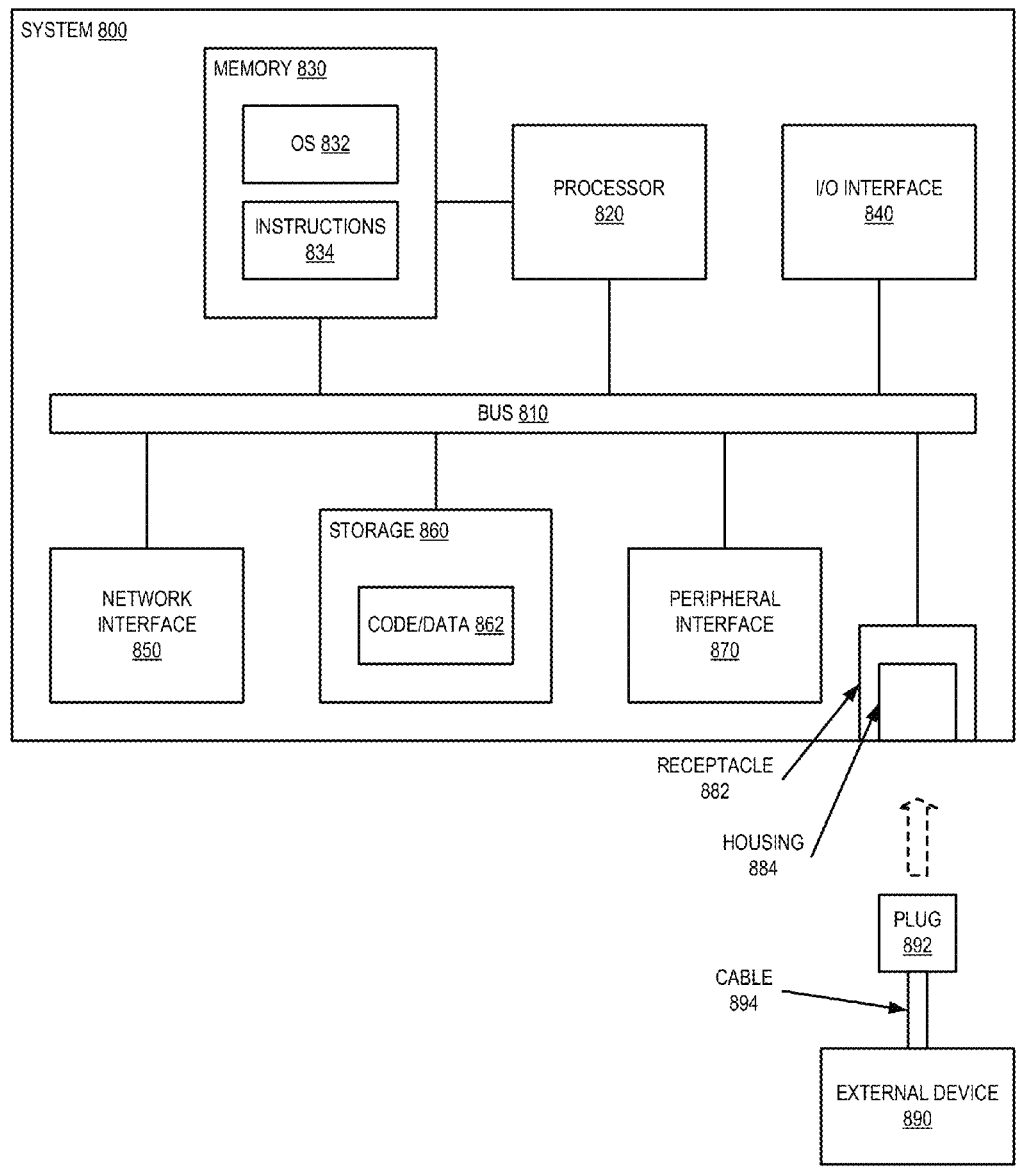
FIG. 8 is a block diagram of an embodiment of a computing system in which an optical connector can be used.

FIG. 8 is a block diagram of an embodiment of a computing system in which a processor package includes photonic components. System 800 represents a computing device in accordance with any embodiment described herein, and can be a laptop computer, a desktop computer, a server, a gaming or entertainment control system, a scanner, copier, printer, or other electronic device. System 800 includes processor 820, which provides processing, operation management, and execution of instructions for system 800. Processor 820 can include any type of microprocessor, central processing unit (CPU), processing core, or other processing hardware to provide processing for system 800. Processor 820 controls the overall operation of system 800, and can be include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 830 represents the main memory of system 800, and provides temporary storage for code to be executed by processor 820, or data values to be used in executing a routine. Memory 830 can include one or more memory devices such as read-only memory (ROM), flash memory, one or more varieties of random access memory (RAM), or other memory devices, or a combination of such devices. Memory 830 stores and hosts, among other things, operating system (OS) 832 to provide a software platform for execution of instructions in system 800. Additionally, other instructions 834 are stored and executed from memory 830 to provide the logic and the processing of system 800. OS 832 and instructions 834 are executed by processor 820.

Processor 820 and memory 830 are coupled to bus/bus system 810. Bus 810 is an abstraction that represents any one or more separate physical buses, communication lines/interfaces, and/or point-to-point connections, connected by appropriate bridges, adapters, and/or controllers. Therefore, bus 810 can include, for example, one or more of a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (commonly referred to as "Firewire"). The buses of bus 810 can also correspond to interfaces in network interface 850.

System 800 also includes one or more input/output (I/O) interface(s) 840, network interface 850, one or more internal mass storage device(s) 860, and peripheral interface 870 coupled to bus 810. I/O interface 840 can include one or more interface components through which a user interacts with system 800 (e.g., video, audio, and/or alphanumeric interfacing). Network interface 850 provides system 800 the ability to communicate with remote devices (e.g., servers, other computing devices) over one or more networks. Network interface 850 can include an Ethernet adapter, wireless interconnection components, USB (universal serial bus), or other wired or wireless standards-based or proprietary interfaces.

Storage 860 can be or include any conventional medium for storing large amounts of data in a nonvolatile manner, such as one or more magnetic, solid state, or optical based disks, or a combination. Storage 860 hold code or instructions and data 862 in a persistent state (i.e., the value is retained despite interruption of power to system 800). Storage 860 can be generically considered to be a "memory," although memory 830 is the executing or operating memory to provide instructions to processor 820. Whereas storage 860 is nonvolatile, memory 830 can include volatile memory (i.e., the value or state of the data is indeterminate if power is interrupted to system 800).

Peripheral interface 870 can include any hardware interface not specifically mentioned above. Peripherals refer generally to devices that connect dependently to system 800. A dependent connection is one where system 800 provides the software and/or hardware platform on which operation executes, and with which a user interacts.

In one embodiment, system 800 can include one or more receptacles 882 with housing 884 to receive plug 892 or mate with plug 892 to connect to external device 890. Receptacle 882 includes housing 884, which provides the mechanical connection mechanisms. As used herein, mating one connector with another refers to providing a mechanical connection. The mating of one connector with another typically also provides a communication connection. Receptacle 882 can connect directly to one or more buses of bus system 810, or receptacle 882 can be associated directly with one or more devices, such as network interface 850, I/O interface 840, storage 860, peripheral interface 870, or processor 820.

Plug 892 is a connector plug that allows external device 890 (which can be any of the same types of devices discussed above) to interconnect with device 800. Plug 892 can be directly built into external device 890 (with or without a cord or cable 894), or can be interconnected to external device 890 via a standalone cable. In one embodiment, plug 892 supports communication via an optical interface or both an optical interface and an electrical interface. The interconnection of receptacle 882 to bus 810 can similarly include an optical path or both an optical and electrical signal path. Receptacle 882 can also include an optical communication connection that is converted to an electrical signal prior to being placed on bus 810. In one embodiment, optical signals are provided directly to the package of processor 820, without passing through an electrical bus or signal outside of the processor package.

In one embodiment, processor 820 is part of a processor package (not specifically shown) that includes both the processor (die) and optical I/O components. The optical I/O components enable the bringing of the optical I/O signals close to the processor, which can improve I/O performance in the system.

Figure 9:
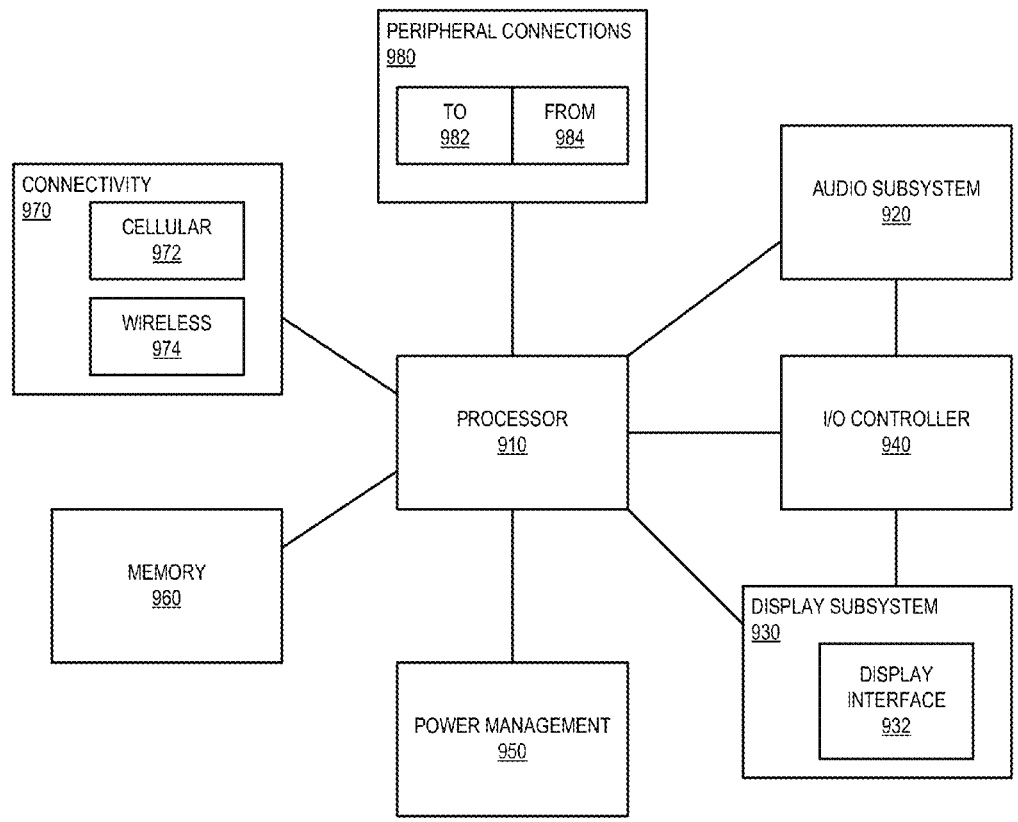
FIG. 9 is a block diagram of an embodiment of a mobile device in which an optical connector can be used.

FIG. 9 is a block diagram of an embodiment of a mobile device in which a processor package includes photonic components. Device 900 represents a mobile computing device, such as a computing tablet, a mobile phone or smartphone, a wireless-enabled e-reader, or other mobile device. It will be understood that certain of the components are shown generally, and not all components of such a device are shown in device 900.

Device 900 includes processor 910, which performs the primary processing operations of device 900. Processor 910 can include one or more physical devices, such as microprocessors, application processors, microcontrollers, programmable logic devices, or other processing means. In one embodiment, processor 910 includes optical interface components in addition to a processor die. Thus, the processor die and photonic components are in the same package. Such a processor package can interface optically with an optical connector in accordance with any embodiment described herein.

The processing operations performed by processor 910 include the execution of an operating platform or operating system on which applications and/or device functions are executed. The processing operations include operations related to I/O (input/output) with a human user or with other devices, operations related to power management, and/or operations related to connecting device 900 to another device. The processing operations can also include operations related to audio I/O and/or display I/O.

In one embodiment, device 900 includes audio subsystem 920, which represents hardware (e.g., audio hardware and audio circuits) and software (e.g., drivers, codecs) components associated with providing audio functions to the computing device. Audio functions can include speaker and/or headphone output, as well as microphone input. Devices for such functions can be integrated into device 900, or connected to device 900. In one embodiment, a user interacts with device 900 by providing audio commands that are received and processed by processor 910.

Display subsystem 930 represents hardware (e.g., display devices) and software (e.g., drivers) components that provide a visual and/or tactile display for a user to interact with the computing device. Display subsystem 930 includes display interface 932, which includes the particular screen or hardware device used to provide a display to a user. In one embodiment, display interface 932 includes logic separate from processor 910 to perform at least some processing related to the display. In one embodiment, display subsystem 930 includes a touchscreen device that provides both output and input to a user.

I/O controller 940 represents hardware devices and software components related to interaction with a user. I/O controller 940 can operate to manage hardware that is part of audio subsystem 920 and/or display subsystem 930. Additionally, I/O controller 940 illustrates a connection point for additional devices that connect to device 900 through which a user might interact with the system. For example, devices that can be attached to device 900 might include microphone devices, speaker or stereo systems, video systems or other display device, keyboard or keypad devices, or other I/O devices for use with specific applications such as card readers or other devices.

As mentioned above, I/O controller 940 can interact with audio subsystem 920 and/or display subsystem 930. For example, input through a microphone or other audio device can provide input or commands for one or more applications or functions of device 900. Additionally, audio output can be provided instead of or in addition to display output. In another example, if display subsystem includes a touchscreen, the display device also acts as an input device, which can be at least partially managed by I/O controller 940. There can also be additional buttons or switches on device 900 to provide I/O functions managed by I/O controller 940.

In one embodiment, I/O controller 940 manages devices such as accelerometers, cameras, light sensors or other environmental sensors, gyroscopes, global positioning system (GPS), or other hardware that can be included in device 900. The input can be part of direct user interaction, as well as providing environmental input to the system to influence its operations (such as filtering for noise, adjusting displays for brightness detection, applying a flash for a camera, or other features).

In one embodiment, device 900 includes power management 950 that manages battery power usage, charging of the battery, and features related to power saving operation. Memory subsystem 960 includes memory devices for storing information in device 900. Memory can include nonvolatile (state does not change if power to the memory device is interrupted) and/or volatile (state is indeterminate if power to the memory device is interrupted) memory devices. Memory 960 can store application data, user data, music, photos, documents, or other data, as well as system data (whether long-term or temporary) related to the execution of the applications and functions of system 900.

Connectivity 970 includes hardware devices (e.g., wireless and/or wired connectors and communication hardware) and software components (e.g., drivers, protocol stacks) to enable device 900 to communicate with external devices. The device could be separate devices, such as other computing devices, wireless access points or base stations, as well as peripherals such as headsets, printers, or other devices.

Connectivity 970 can include multiple different types of connectivity. To generalize, device 900 is illustrated with cellular connectivity 972 and wireless connectivity 974. Cellular connectivity 972 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, or other cellular service standards. Wireless connectivity 974 refers to wireless connectivity that is not cellular, and can include personal area networks (such as Bluetooth), local area networks (such as WiFi), and/or wide area networks (such as WiMax), or other wireless communication. Wireless communication refers to transfer of data through the use of modulated electromagnetic radiation through a non-solid medium. Wired communication occurs through a solid communication medium.

Peripheral connections 980 include hardware interfaces and connectors, as well as software components (e.g., drivers, protocol stacks) to make peripheral connections. It will be understood that device 900 could both be a peripheral device ("to" 982) to other computing devices, as well as have peripheral devices ("from" 984) connected to it. Device 900 commonly has a "docking" connector to connect to other computing devices for purposes such as managing (e.g., downloading and/or uploading, changing, synchronizing) content on device 900. Additionally, a docking connector can allow device 900 to connect to certain peripherals that allow device 900 to control content output, for example, to audiovisual or other systems.

In addition to a proprietary docking connector or other proprietary connection hardware, device 900 can make peripheral connections 980 via common or standards-based connectors. Common types can include a Universal Serial Bus (USB) connector (which can include any of a number of different hardware interfaces), DisplayPort including MiniDisplayPort (MDP), High Definition Multimedia Interface (HDMI), Firewire, or other type.

Any of the interconnections or I/O can be performed optically. Thus, I/O controller 940, display subsystem 930, memory 960, connectivity 970, and/or peripheral connections 980 can have an optical connection with processor 910 or with an external component. In the case of an optical connection, the optical connection can be accomplished through an optical coupler in accordance with any embodiment described herein.

To the extent various operations or functions are described herein, they can be described or defined as software code, instructions, configuration, and/or data. The content can be directly executable ("object" or "executable" form), source code, or difference code ("delta" or "patch" code). The software content of the embodiments described herein can be provided via an article of manufacture with the content stored thereon, or via a method of operating a communication interface to send data via the communication interface. A machine readable storage medium can cause a machine to perform the functions or operations described, and includes any mechanism that stores information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). A communication interface includes any mechanism that interfaces to any of a hardwired, wireless, optical, etc., medium to communicate to another device, such as a memory bus interface, a processor bus interface, an Internet connection, a disk controller, etc. The communication interface can be configured by providing configuration parameters and/or sending signals to prepare the communication interface to provide a data signal describing the software content. The communication interface can be accessed via one or more commands or signals sent to the communication interface.

Various components described herein can be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc.

Besides what is described herein, various modifications can be made to the disclosed embodiments and implementations of the invention without departing from their scope. Therefore, the illustrations and examples herein should be construed in an illustrative, and not a restrictive sense. The scope of the invention should be measured solely by reference to the claims that follow.

What is claimed is:

1. An optical connector comprising:
    a connector body comprising a linear electro-magnetic material comprising an outward-facing surface, a circuit-facing surface, and a reflection surface, the outward-facing surface to interface with a fiber array, the circuit-facing surface to interface with an optical integrated circuit, and the reflection surface to redirect light between the outward-facing surface and the circuit-facing surface at approximately a right angle in free space within the connector body;
    a first two-dimensional lens array with lenses at the outward-facing surface, the first lens array being at least a two-by-two array; and
    a second two-dimensional lens array with an array of lenses having one-to-one correspondence to the first lens array, the lenses of the second lens array forming optical paths between the circuit-facing surface and the outward-facing surface via the reflection surface, wherein the second two-dimensional lens array is separated from the circuit facing surface by an air gap to increase an alignment tolerance between the first lens array and the second lens array, wherein the outward-facing surface is at a first angle other than the right angle relative to the circuit-facing surface;
    wherein the first and second lens arrays include lenses that collimate the light towards the reflection surface to the other lens array, and focus light redirected off of the reflection surface from the other lens array.

2. The optical connector of claim 1, wherein the linear electro-magnetic material has a low coefficient of thermal expansion (CTE) and high enough softening point to withstand solder reflow with minimal dimensional deviation.

3. The optical connector of claim 1, wherein the connector body comprises a prism.

4. The optical connector of claim 1, wherein the connector body comprises a molded component.

5. The optical connector of claim 1, wherein the reflection surface comprises a total internal reflection (TIR) surface.

6. The optical connector of claim 1, wherein the reflection surface comprises a mirror.

7. The optical connector of claim 1, wherein the outward-facing surface interfaces with the fiber array with a flat, vertical interface surface.

8. The optical connector of claim 1, wherein the outward-facing surface interfaces with the fiber array with an angled interface surface.

9. The optical connector of claim 1, wherein the first lens array is inset into the outward-facing surface of the connector body, and separated from the fiber array by an air gap.

10. The optical connector of claim 1, wherein the first lens array is disposed on the outward-facing surface.

11. The optical connector of claim 1, wherein the first lens array is a disposed on a lens body separate from the connector body, which is aligned and attached to the connector body.

12. The optical connector of claim 1, wherein the first lens array is disposed on a lens body separate from the connector body, and interfaces with the connector body via guide pin holes on a multi-terminal fiber array connector.

13. The optical connector of claim 1, wherein the first lens array is disposed on a multi-terminal fiber array connector that mates with the connector body.

14. The optical connector of claim 1, wherein the second lens array is disposed on a lens body separate from the connector body, wherein the lens body is aligned and attached to the connector body.

15. The optical connector of claim 1, wherein the at least two-by-two array includes a first row and a second row of lenses, and the optical paths of the first row cross the optical paths of the second row in free space inside the connector body.

16. The optical connector of claim 1, wherein the optical connector is mated to multimode optical fibers.

17. A system comprising:
an optical coupler including
  a connector body comprising a linear electro-magnetic material comprising a mating surface to mate with a fiber array connector, a circuit-facing surface to interface with an integrated optical circuit, and a reflection surface to redirect light between the mating surface and the circuit-facing surface at approximately a right angle in free space within the connector body;
  a first two-dimensional lens array with lenses disposed on the mating surface, the first lens array being at least a two-by-two array; and
  a second two-dimensional lens array with an array of lenses having one-to-one correspondence to the first lens array, the lenses of the second lens array forming optical paths between the circuit-facing surface and the mating surface via the reflection surface, wherein the second two-dimensional lens array is separated from the circuit facing surface by an air gap to increase an alignment tolerance between the first lens array and the second lens array, wherein the mating surface is at a first angle other than the right angle relative to the circuit-facing surface;
wherein the first and second lens arrays include lenses that collimate the light towards the reflection surface to the other lens array, and focus light redirected off of the reflection surface from the other lens array; and
an optical connector having an array of single-mode optical fibers coupled to the mating surface.

18. The system of claim 17, wherein the mating surface interfaces with the fiber array with an angled interface surface.

19. The system of claim 17, wherein the first lens array is inset into the mating surface of the connector body, and separated from the fiber array by an air gap.

20. The system of claim 17, wherein the first lens array is disposed on the mating surface.

21. The system of claim 17, wherein the at least two-by-two array includes a first row and a second row of lenses, and the optical paths of the first row cross the optical paths of the second row in free space inside the connector body.

22. The system of claim 21, wherein the at least two-by-two array includes a 2×12 lens array.

23. The system of claim 21, wherein the at least two-by-two array includes a 4×12 lens array.

* * * * *